No. 789,446. PATENTED MAY 9, 1905.
A. L. PARCELLE.
SPEED INDICATOR.
APPLICATION FILED SEPT. 29, 1898.
4 SHEETS—SHEET 1.
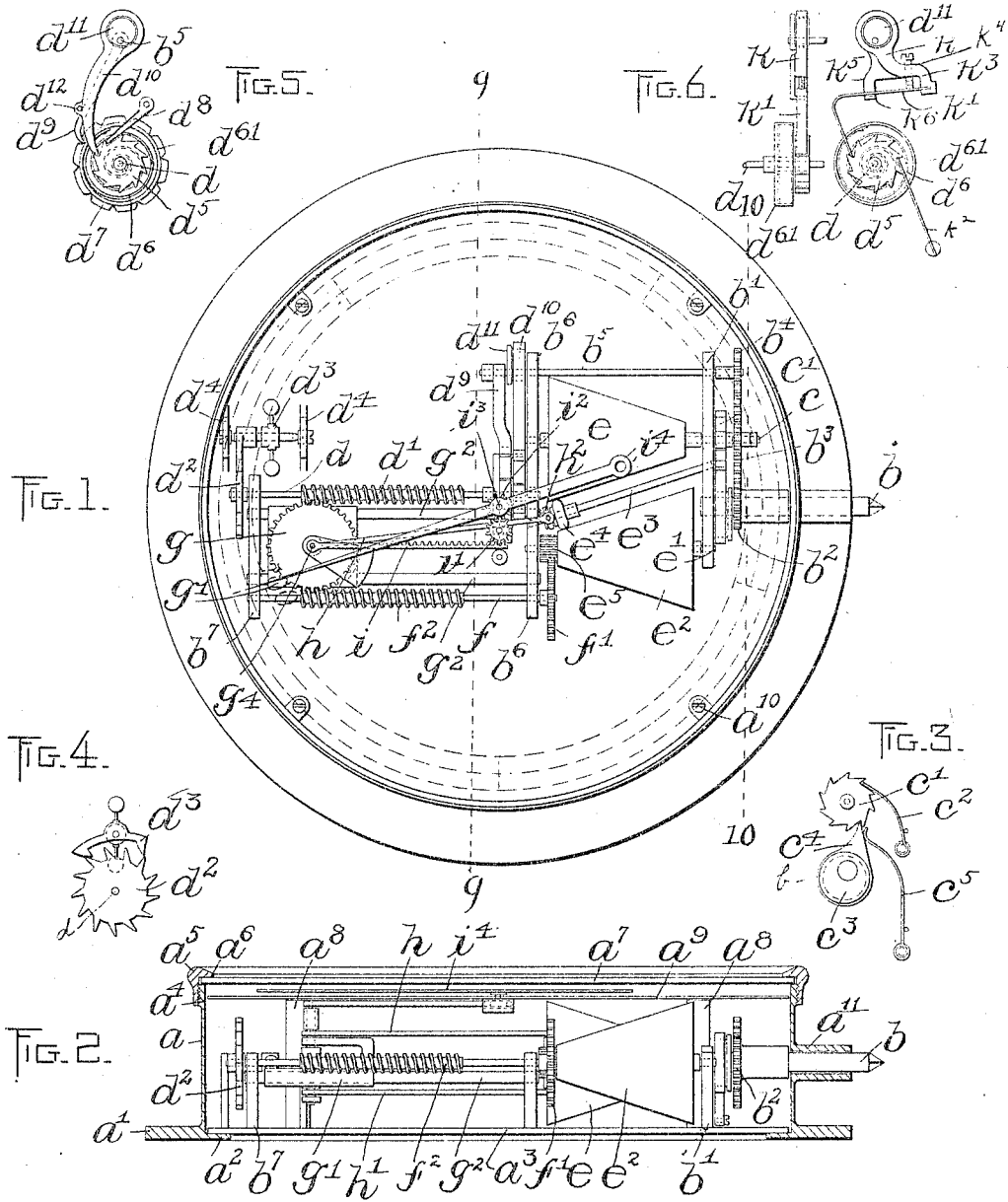
Witnesses.
Inventor.

No. 789,446. PATENTED MAY 9, 1905.
A. L. PARCELLE.
SPEED INDICATOR.
APPLICATION FILED SEPT. 29, 1898.
4 SHEETS—SHEET 2.
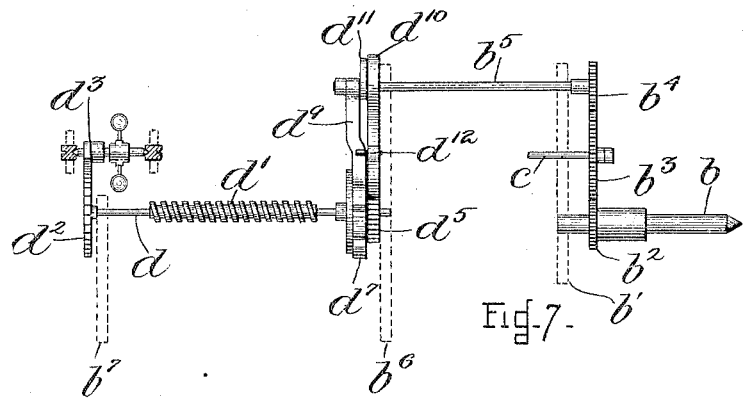
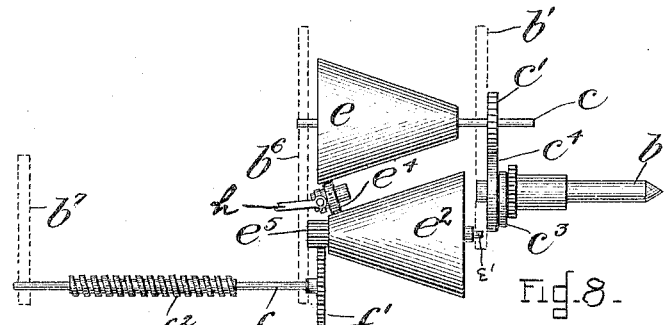
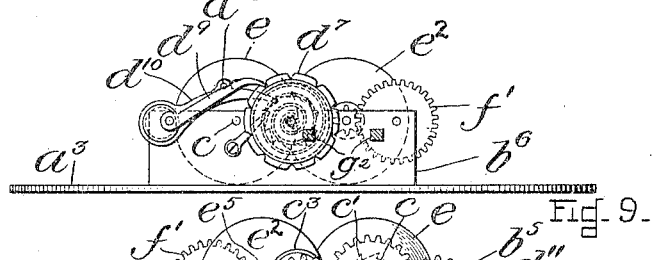
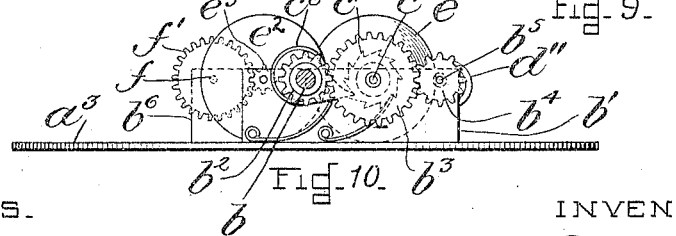
WITNESSES. INVENTOR No. 789,446. PATENTED MAY 9, 1905.
A. L. PARCELLE.
SPEED INDICATOR.
APPLICATION FILED SEPT. 29, 1898.

4 SHEETS—SHEET 3.

WITNESSES. INVENTOR.

No. 789,446. PATENTED MAY 9, 1905.
A. L. PARCELLE.
SPEED INDICATOR.
APPLICATION FILED SEPT. 29, 1898.

4 SHEETS—SHEET 4.

Witnesses:
P. W. Pezzetti
Geo. H. Hall

Inventor:
A. L. Parcelle
by Wright Brown & Dunby
his Attorneys.

No. 789,446.　　　　　　　　　　　　　　　　　　　　Patented May 9, 1905.

UNITED STATES PATENT OFFICE.

ALBERT L. PARCELLE, OF BOSTON, MASSACHUSETTS.

SPEED-INDICATOR.

SPECIFICATION forming part of Letters Patent No. 789,446, dated May 9, 1905.

Application filed September 29, 1898. Serial No. 692,228.

*To all whom it may concern:*

Be it known that I, ALBERT L. PARCELLE, of Boston, in the county of Suffolk and State of Massachusetts, have invented certain new and useful Improvements in Speed-Indicators, of which the following is a specification.

This invention has primarily for its object to provide a device for measuring the speed at which a shaft is rotating or which a vehicle—such as a locomotive, a motor-carriage, or a bicycle—is traveling, and, secondarily, it has for its object to provide a device of the class named which shall be operated positively and not by means of centrifugally-actuated governors or weights, whereby the number of rotations of a shaft in a given time or the speed of travel may be indicated with the greatest accuracy.

To these ends the invention consists of a speed meter or measure in which a body moving or rotating at the unknown speed is compared with a body moving or rotating at a known speed, and the difference is ascertained and indicated.

It further consists in certain features of construction and relative arrangement of parts, all as illustrated on the drawings and now to be described in detail, and finally pointed out in the claims hereunto annexed.

Figure 11:
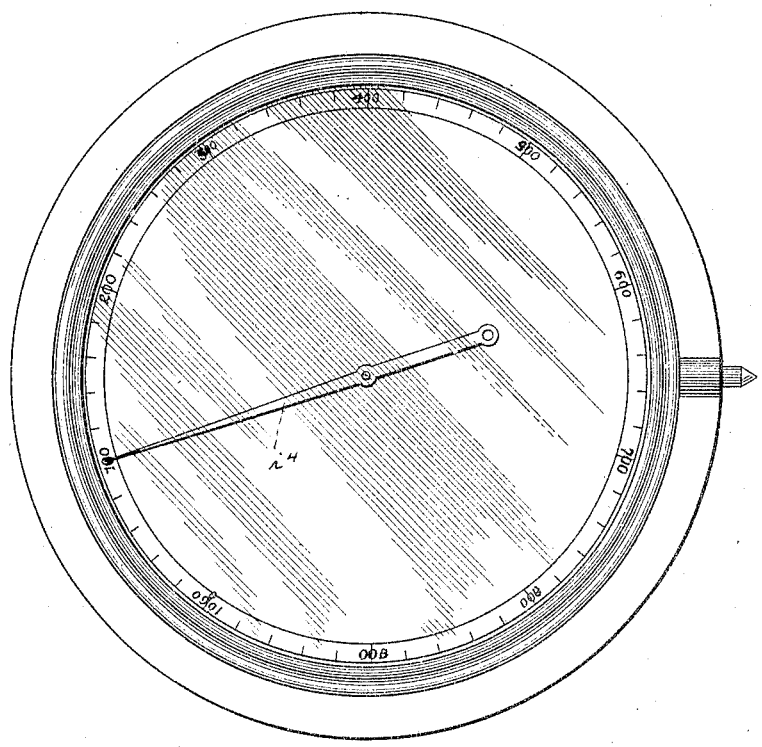
Figure 12:
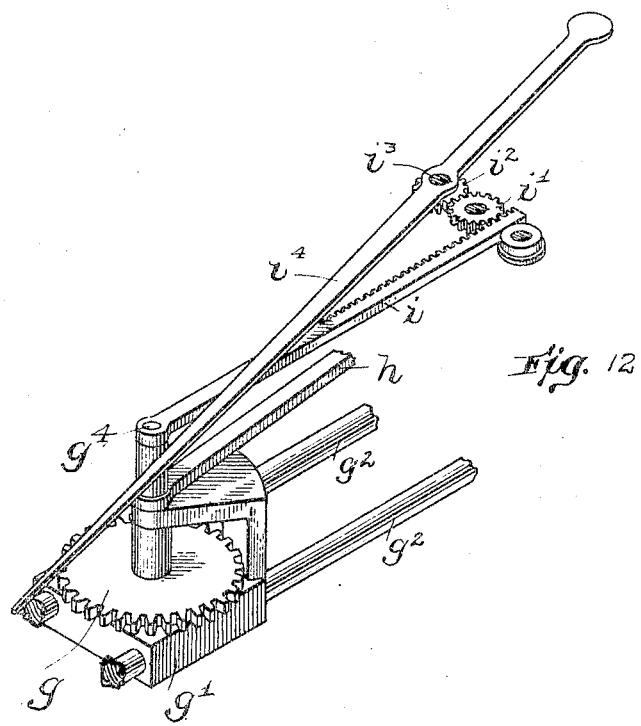

Of the drawings, Figure 1 represents in plan view a tachometer or speed-meter embodying my invention. Fig. 2 represents a sectional view through the same, the internal mechanism being shown in side elevation. Fig. 3 represents a power-transmitting mechanism between two moving parts. Fig. 4 represents the escapement. Figs. 5 and 6 indicate different means for winding the spring by which one of the parts is rotated at a known or predetermined speed. Fig. 7 illustrates the mechanism by which one of the worms is driven at a predetermined rate of speed. Fig. 8 illustrates the mechanism by which the other worm is driven at a variable or unknown speed. Fig. 9 represents a section on the line 9 9 of Fig. 1. Fig. 10 represents a section on the line 10 10, Fig. 1. Fig. 11 represents an enlarged plan of the meter and shows the dial. Fig. 12 represents the worm-wheel and its connections.

Referring to the drawings, which portray one embodiment of the invention selected by me for the purpose of illustration, $a$ indicates a cylindrical casing having a base-flange $a'$ and an internal flange $a^2$ to receive the base-plate $a^3$, which supports the operative parts of the mechanism. The upper end of the casing is externally threaded at $a^4$ to receive an internally-threaded ring $a^5$, with an inwardly-extending flange $a^6$ for clamping the glass plate $a^7$ upon the top of the casing. The casing is also formed or provided with the internal posts or ribs $a^8$ to receive the scale-plate $a^9$, which is fastened thereon by screws $a^{10}$ and upon which is marked a suitable graduated scale. Within the dust-proof box thus formed are placed the operative parts of the mechanism by means of which the speed is indicated.

The arbor $b$, which is connected in any suitable way to the rotating part whose speed is to be measured, extends through an annular flange or bearing $a^{11}$ in the side of the casing and is journaled at its inner end in the standard $b'$. It is formed or provided with a gear-wheel $b^2$, which through an idler-gear $b^3$ imparts rotation to a gear $b^4$ on a shaft $b^5$, journaled in the standard $b'$ and in a similar parallel standard $b^6$, supported on the base-plate $a^3$. The idler $b^3$ is loosely mounted upon a shaft $c$, journaled in the standards $b'$ $b^6$, and upon which other devices are mounted, as will be hereinafter explained.

By power-transmitting mechanism, including a coiled spring which I shall subsequently describe, motion is transmitted from the shaft $b^5$ to a shaft $d$, having a worm or member $d'$ and journaled in the standard $b^6$ and in another parallel standard $b^7$. On its end the shaft $d$ has an escapement-wheel $d^2$, with which is engaged a suitable weighted escapement or balance $d^3$, journaled in the standards $d^4$ $d^4$, extending upward from the base-plate $a^3$.

The escapement permits the worm to rotate at a predetermined or known rate of speed, although the arbor $b$ may be rotating with the unknown speed which it is desired to measure, and it is with this worm or member that another member moving at the unknown speed is compared in order to ascertain the difference in speed, as will be set forth in detail.

On the shaft $c$ is a ratchet-wheel $c'$, Fig. 10, against which rests a retaining-pawl $c^2$, as indicated in Fig. 3, and on the arbor $b$ there is an eccentric $c^3$, having its eccentric-strap $c^4$ in the nature of a pawl or dog whose end is held in engagement with the ratchet by a spring $c^5$, whereby the rotation of the arbor $b$ imparts a continuous step-by-step movement to the shaft $c$.

The object of driving by an eccentric is for the purpose of always rotating the shaft $c$ in the same direction irrespective of the direction of rotation of the arbor $b$.

Rigidly secured upon the shaft $c$ is a cone-pulley $e$, and mounted upon the shaft $e'$, journaled in the standards $b'$ $b^6$, is another cone-pulley $e^2$ similar to the first, but arranged oppositely, whereby they taper in opposite directions. The shafts $c$ and $e'$ are parallel, and consequently the peripheries of the two cones are the same distance apart throughout their lengths.

Between the two cones and in their axial plane is placed a shaft $e^3$, which is equidistant from the peripheries of each cone and has its ends mounted in the standards $b'$ $b^6$. A friction-pulley $e^4$ is journaled upon the shaft so as to slide loosely thereon while it remains in engagement with both cones, so that power may be transmitted from the cone $e$ to the cone $e^2$. The last-mentioned cone is formed with a pinion $e^5$, intermeshing with and driving a gear $f'$ on the end of a shaft $f$, parallel to the shaft $d$, and having its end journaled in the standards $b^6$ $b^7$. It has a worm or member $f^2$ similar to that at $d'$, and between the two worms $d'$ $f^2$ is a worm-wheel $g$, which intermeshes with both of them and which is journaled upon a carriage $g'$, sliding in horizontal guide-rods $g^2$ $g^3$, whose ends are secured in the standards $b^6$ $b^7$. On the projecting ends of the arbor $g^4$, on which the worm-wheel is journaled, are pivoted two links or connecting-rods $h$ $h'$, connected at their free ends to a collar $h^2$, lying in a groove in the hub of the friction-wheel $e^4$. A rack $i$ is also secured at one end to the arbor $g^4$, and it intermeshes with a pinion $i'$, journaled on a stud projecting downwardly from the scale-plate $a^9$ and intermeshing with and driving another pinion $i^2$ on an arbor $i^3$, which projects upwardly through the scale-plate $a^9$ to receive an index or pointer $i^4$, which coöperates with the graduated scale upon the scale-plate to indicate the rate of speed at which the body is moving.

As has been stated, the worm $d'$ is driven by a spring, and its rotation is governed by an escapement. To obtain the best results, this spring should be kept at an even tension, and to that end I provide for its being wound as rapidly as it runs down, and, moreover, it must be wound at a proper speed when the lowest speed is being measured and at the same time must not be overwound when the speed being measured is relatively high. Two methods for accomplishing these results are shown.

Referring first to Fig. 5, it will be seen that the spring is contained in a barrel or flanged disk, as at $d^4$, this part being also shown in Fig. 6. The barrel or disk is firmly attached to the shaft $d$ and rotates with it, the outer end of the spring $d^6$ being attached to the barrel and the inner end being attached to a sleeve which surrounds the shaft $d$. On the end of the sleeve a ratchet $d^5$ is firmly attached, whereby by turning the ratchet with a step-by-step motion the spring will be properly wound. On the outside of the barrel is mounted a toothed or notched wheel $d^7$, which rotates with the shaft $d$, and resting upon the top of its teeth is the free end of a lazy pawl, lever, or bar $d^9$, the other end of which is mounted on the end of the shaft $b^5$. This last-mentioned shaft also carries an eccentric $d^{11}$, whose strap is formed in the nature of a pawl $d^{10}$, adapted to rotate the ratchet $d^5$. This pawl $d^{10}$ has a pin $d^{12}$, which rides upon the lever or lazy pawl $d^9$ and is thereby held out of engagement with the ratchet $d^5$, except at such times when the notched wheel $d^7$ is rotated far enough to let the end of the lever $d^9$ drop into one of its notches, at which time the eccentric-pawl $d^{10}$ will engage a tooth of the ratchet $d^5$ and wind the spring up one tooth, or the amount it has run down. A retaining-pawl $d^8$ holds the spring from unwinding. By this mechanism the spring cannot be wound except when the barrel, with its notched wheel, has rotated far enough under the action of the unwinding spring for the lever or bar $d^9$ to fall into a notch, and thereby permit the pawl $d^{10}$ to engage the tooth. It is evident that where the instrument is designed to be placed upon a wall or in a permanent position a weight may be substituted for the spring, the other parts being substantially as they are shown.

In Fig. 6 the mechanism comprises a pawl $k$, consisting of an arm $k^3$ and a spring $k'$, operated by the eccentric $d^{11}$. The bent spring $k'$ has its end inserted in a recess in the end of the arm and its free end bears against the ratchet $d^5$, which is held against reverse rotation by the spring-pawl $k^2$. The spring $k'$ and the arm $k^3$ constitute a resilient or yielding pawl which when the spring $d^6$ is wound tightly gives and does not rotate the ratchet $d^5$; but when, however, the spring $d^6$ is unwound the spring $k'$ imparts a movement to the ratchet, as will be readily understood. In order to vary the tension of the spring $k'$, I employ an adjusting-screw $k^4$, passed through the arm $k^3$ and bearing against the spring, and to limit the adjustment of the spring I provide an arm $k^5$, having a lug $k^6$ extending under it.

The operation of the device is as follows: Let it be supposed that the lowest rate of speed of the arbor $b$ that can be indicated is one hundred per minute and that by means of the escapement the worm-shaft $d$ travels at a regular arbitrary speed of ten rotations per minute. The gearing between the arbor $b$ and the shaft $f$ is such that if the arbor $b$ be rotated at the speed of one hundred per minute the rate of speed of rotation of the worm-shaft $f$ will be likewise ten. Consequently if the unknown speed of the arbor $b$ is in reality one hundred both worm-shafts will rotate at the same rate of speed and the worm-wheel $g$ will be merely rotated by them without advancing. But suppose that the unknown speed is in reality two hundred rotations per minute. Then the shaft $f$ will be driven at the rate of twenty rotations per minute, or double that of the worm-shaft $d$. Immediately, therefore, the worm-wheel $g$ will be caused to advance, one side of its periphery being driven more rapidly than the other side. This will force the carriage along the guides $g^2 g^3$, and as the carriage moves it will slide the friction-disk $e^4$ along the shaft $e^3$ to retard the rotation of the worm-shaft $f$ until it is equal to the rotation of the worm-shaft $d$. The movement of the carriage also, by reason of the rack $i$, causes a partial rotation of the pinions $i'$ $i^2$ and the consequent movement of the index $i^4$ over the scale. The index previously stood at "100," and it will now be seen that it has advanced to "200," having traversed one hundred spaces, or the difference between the known speed of one hundred (or ten) and the unknown speed of two hundred, (or twenty,) and the friction-roller $e^4$ will have advanced one-tenth of the length of the two cones $e$ $e^2$.

The capacity of the instrument to measure both high and low speeds is limited only by the length and pitch of the two cones $e^2$ $e^3$. Upon the drawings the ratio is shown as ten to one. Hence if one hundred revolutions per minute is the lowest rate of speed that can be measured one thousand per minute would be the highest speed for this particular instrument which I have illustrated, and when measuring one thousand revolutions per minute the friction-roller $e^4$ would stand at the other end of the cones. If the main arbor be rotated at any speed less than one hundred rotations per minute, the worm-shaft $f$ will not be rotated as rapidly as ten per minute, nor would the worm-shaft $d$, as the spring will not be wound fast enough, and consequently the speed of the two worms will be equal and no movement of the index will take place.

The two rotating members—*i. e.*, the worms—are independently driven. Although the motive power for winding the spring which drives one of the worms is furnished by the shaft which actuates the other worm, yet the two are independent in the sense that one worm does not directly or through an idler impart rotation to the other. Consequently the device indicates the difference in speed between two independently actuated or driven members.

It is evident that my invention may be employed for a variety of purposes, being not only applicable for measuring the speed of rotation of dynamos, shafting, &c., but also of motor-vehicles, bicycles, locomotives, and the like, in which case the scale will represent miles or fractions thereof, as well as revolutions per minute. The index remains at the position to which it was last moved, save for a slight movement due to the unwinding of the spring which drives the constant worm $d'$.

It will be noted that the index is carried to its indicating position by a gradual and even motion, the time required to bring it thereto depending upon the distance it has to traverse. Consequently there is no danger of rocking or jarring the device by sudden jerks.

Having thus explained the nature of the invention and described a way of constructing and using the same, though without attempting to set forth all of the forms in which it may be made or all of the modes of its use, I declare that what I claim is—

1. A speed-measure comprising a member moving at an unknown speed, an independently-actuated member moving at a known speed, a third member moved by said members, and operating to change the speed of the said first member to that of the second, and means for indicating the position of the said third member.

2. A speed-measure comprising a member originally driven at an unknown speed through a driven train actuated by a driver, an independently-actuated member moving at a known speed, automatic means for adjusting said driven train to change the speed of the said first member to that of the second member, and automatic means for indicating the amount of such change in the speed of the said first member.

3. A speed-measure comprising a member originally driven at an unknown speed through a driven train actuated by a driver, an independently-actuated member moving at a known speed, automatic means for adjusting said driven train to change the speed of the first member to that of the second member including a movable third member, and automatic means for indicating the position of the said third member.

4. A speed-measure comprising a member moving at an unknown speed, an independently-actuated member moving at a known speed, means operated by said members for changing the speed of the said first member to that of the said second member, and means for indicating the degree of variation in the speed of the said first member.

5. A speed-measure comprising a member originally driven at an unknown speed through a driven train actuated by a driver, an independently-actuated member moving at a known speed, automatic means operated by said members for adjusting said driven train to change the speed of the said first member to that of the second member, and indicating devices for indicating the degree of variation in the speed of the said first member.

6. A speed-measure comprising a member originally driven at an unknown speed through a driven train actuated by a driver, an independently-actuated member moving at a known speed, automatic means for adjusting said driven train to change the speed of the said first member to that of the second member, a graduated scale-plate and a pointer movable thereon and operatively connected with said means whereby the extent of such variation is automatically indicated on the scale-plate.

7. A speed-measure comprising two independently-actuated rotary members, one moving at a known speed and the other at the unknown speed, and a member actuated by the first-mentioned members, whereby when said first-mentioned members are rotated at different speeds, it is caused to travel, devices operated by said traveling member for changing the speed of the second said member to that of the first, and mechanism for indicating the travel of the said traveling member.

8. A speed-measure comprising two rotary worms, one rotating at a known speed, and the other at the unknown speed, a worm-wheel meshing with said worms and adapted to travel longitudinally thereof, devices operated by said worm-wheel for changing the speed of the second member to that of the first, and mechanism for indicating the position of travel of the said worm-wheel.

9. A speed-measure comprising an initial power-receiving arbor, a worm actuated indirectly thereby and rotating at a predetermined speed, a second worm actuated by said arbor and rotating at an unknown speed, oppositely-arranged cones interposed between the arbor and the second said worm, an axially-movable friction-wheel between said cones, a worm-wheel intermeshing with both of said worms, a connection between said worm-wheel and said friction-wheel, to move it axially of the cones, and indicating mechanism operated by said worm-wheel.

10. A speed-measure comprising a member rotating at an unknown speed, an independent spring-actuated rotary member, an escapement mechanism for causing said spring-actuated member to rotate at a known speed, means for automatically changing the speed of the first member to that of the said second member and indicating mechanism operated by said means for indicating the degree of variation in speed of the said first member.

11. In combination, two independently-actuated rotating members, and a third member actuated by both of said members initially moving at different speeds to equalize their speed.

12. In combination, two independently-actuated rotating members, a third member actuated by both of said members to equalize their speed, and mechanism for determining the movement or position of the said third member.

13. In combination, three movable members, two of which are independently actuated and operate upon the third to control or regulate the speed of one of them, said two independently-actuated members initially moving at different speeds.

In testimony whereof I have affixed my signature in presence of two witnesses.

ALBERT L. PARCELLE.

Witnesses:
MARCUS B. MAY,
C. C. STECHER.